Sept. 1, 1931.　　　A. C. SELETZKY　　　1,821,240
MACHINE FOR TESTING ELECTRIC LAMPS
Filed Jan. 15, 1927　　　5 Sheets-Sheet 1

Inventor
Anatoli C. Seletzky
By
Charles B. Mann Jr.
Attorney

Sept. 1, 1931.  A. C. SELETZKY  1,821,240
MACHINE FOR TESTING ELECTRIC LAMPS
Filed Jan. 15, 1927   5 Sheets-Sheet 3

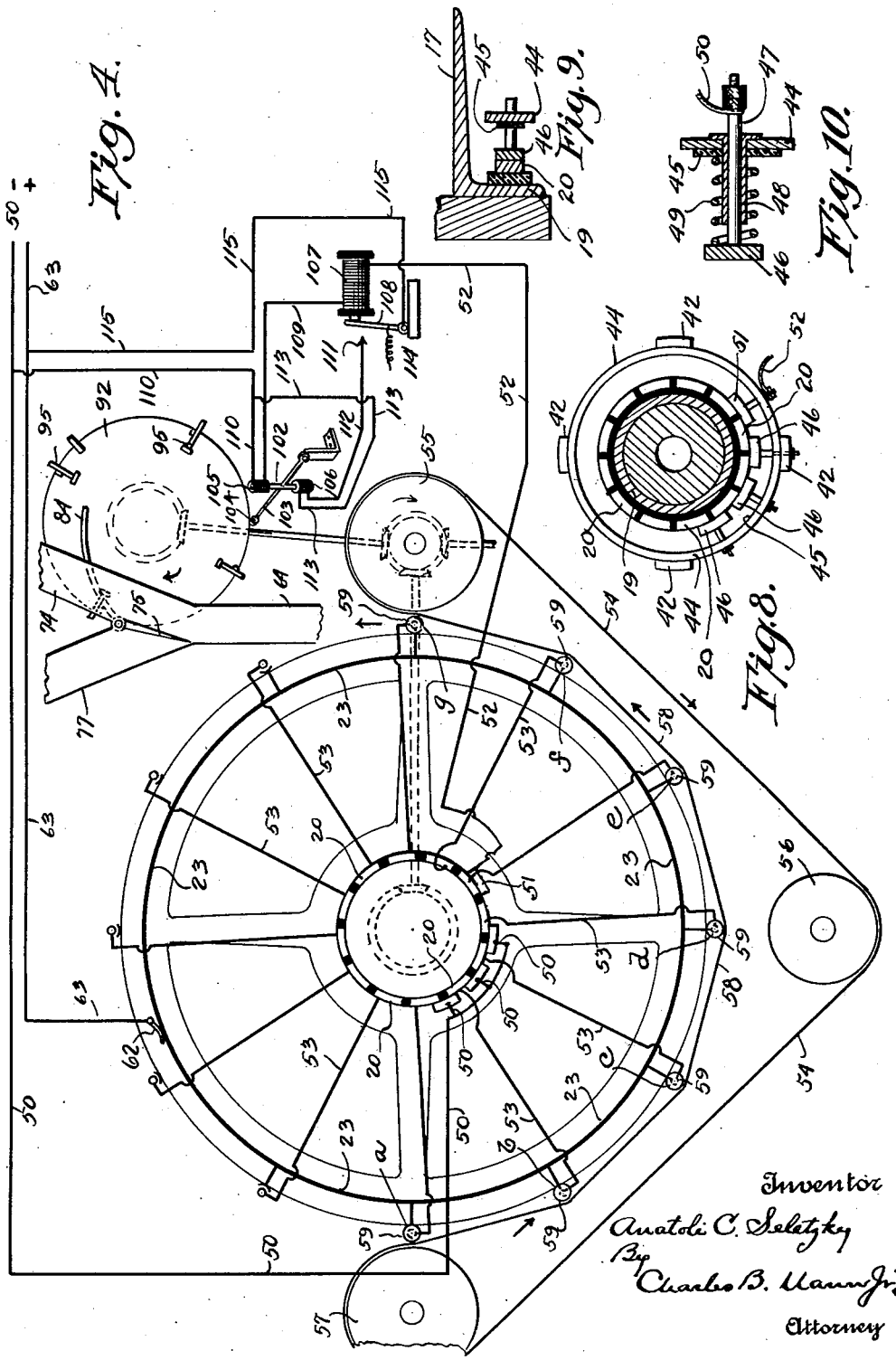

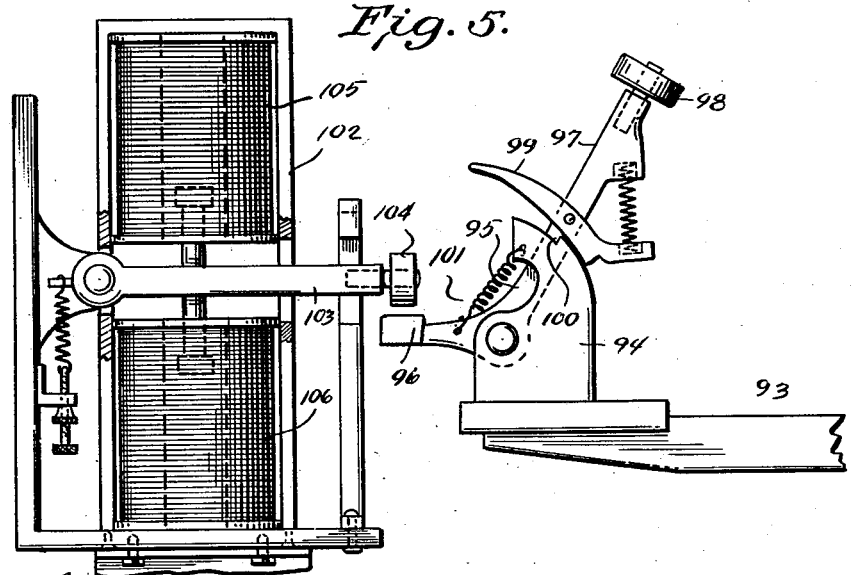
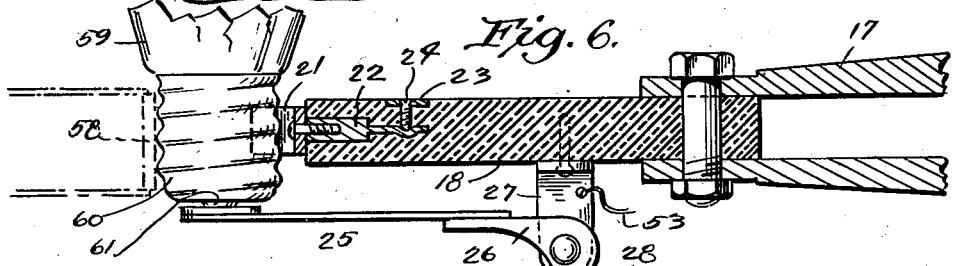
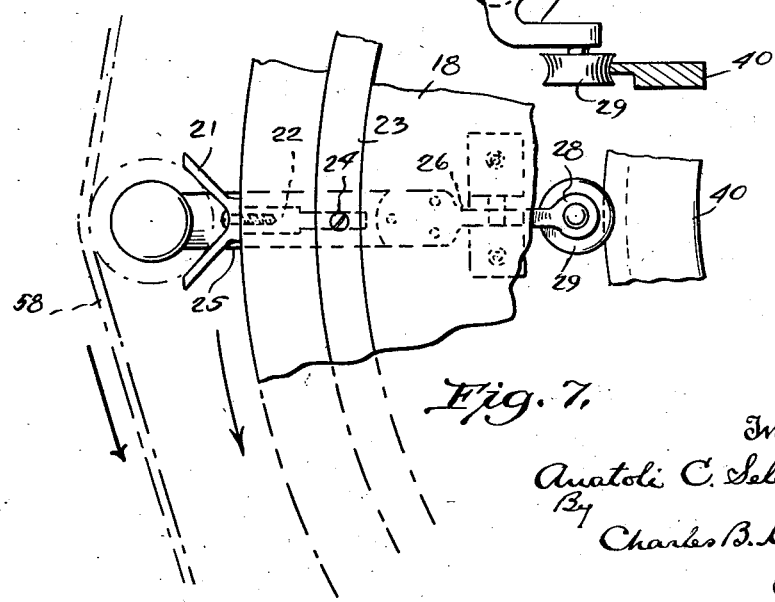

Patented Sept. 1, 1931

1,821,240

UNITED STATES PATENT OFFICE

ANATOLI C. SELETZKY, OF BALTIMORE, MARYLAND, ASSIGNOR TO THE WESTINGHOUSE LAMP COMPANY, OF NEW YORK, N. Y., A CORPORATION OF PENNSYLVANIA

MACHINE FOR TESTING ELECTRIC LAMPS

Application filed January 15, 1927. Serial No. 161,336.

This invention relates to an improved automatic means for testing incandescent electric lamps.

An object of the invention is to provide an improved mechanism for receiving electric lamps and advancing them and during the advance movement testing the same and finally discharging the lamps with the good lamps separated from the defective or bad lamps.

Another object of the invention is to provide a carrier for electric lamps and to combine with that carrier a means for closing a circuit through the lamps, if the same are good, said circuit-closing means being arranged to effect a separation of the good from the bad lamps.

A further object is to provide a testing means for electric lamps combined with a conveyer and to also provide a circuit-controlled means whereby the good and bad lamps may be separated by the conveyer.

With these and other objects in view, the invention is illustrated in the accompanying drawings, wherein,—

Fig. 4 illustrates diagrammatically the main parts of the apparatus and the wiring circuits between the several parts.

Fig. 5 shows a view of the solenoid and the trip device actuated thereby for operating the conveyer-switch.

Fig. 6 illustrates a portion of the carrier with the lamp clamp and contact devices at the periphery thereof,—the parts being shown in side elevation.

Fig. 7 shows the same in top view.

Fig. 8 illustrates a cross-sectional detail through the hub parts and the contacts arranged about the same.

Fig. 9 shows a vertical sectional detail through the same, and

Fig. 10 illustrates a sectional detail through the outer contact and the ring support and the contact guide.

Figure 1:
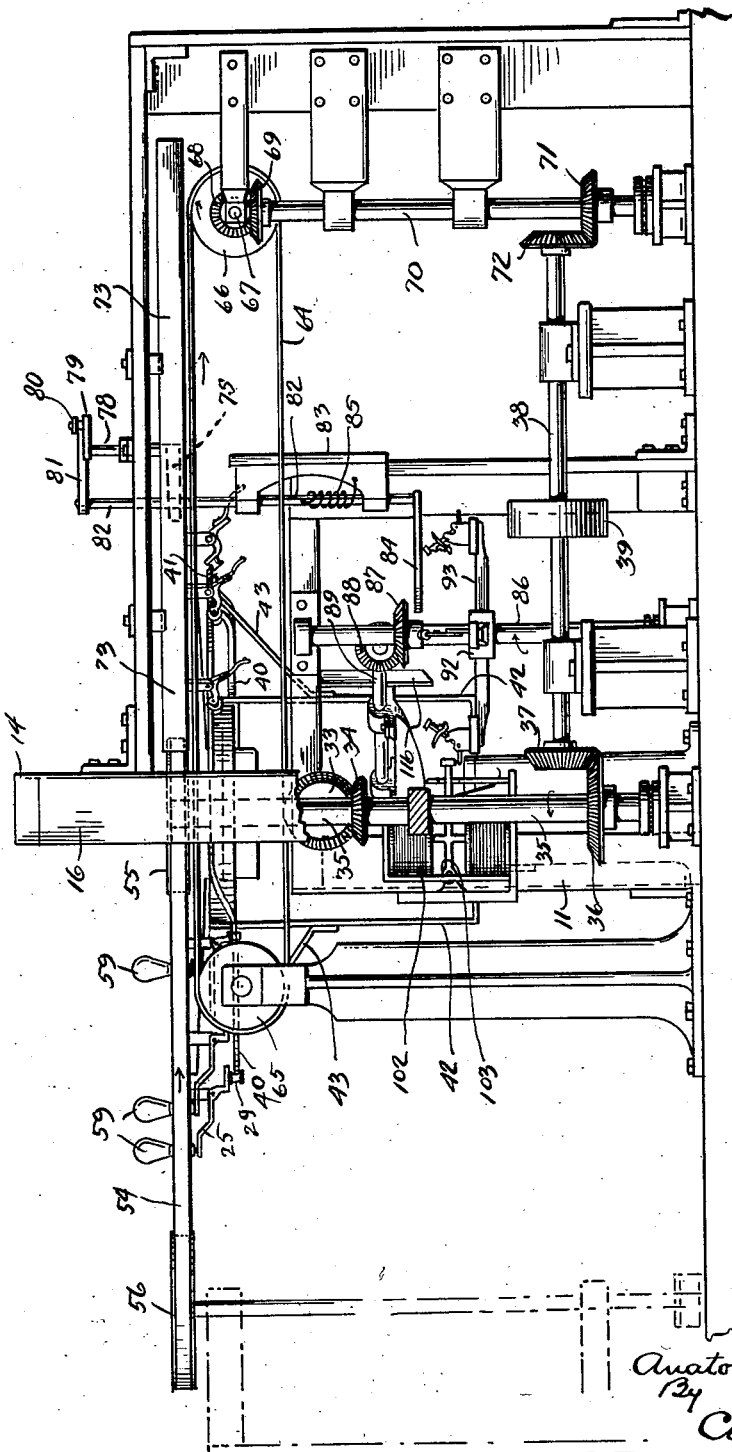
Fig. 1 shows the machine in side elevation.
Figure 2:
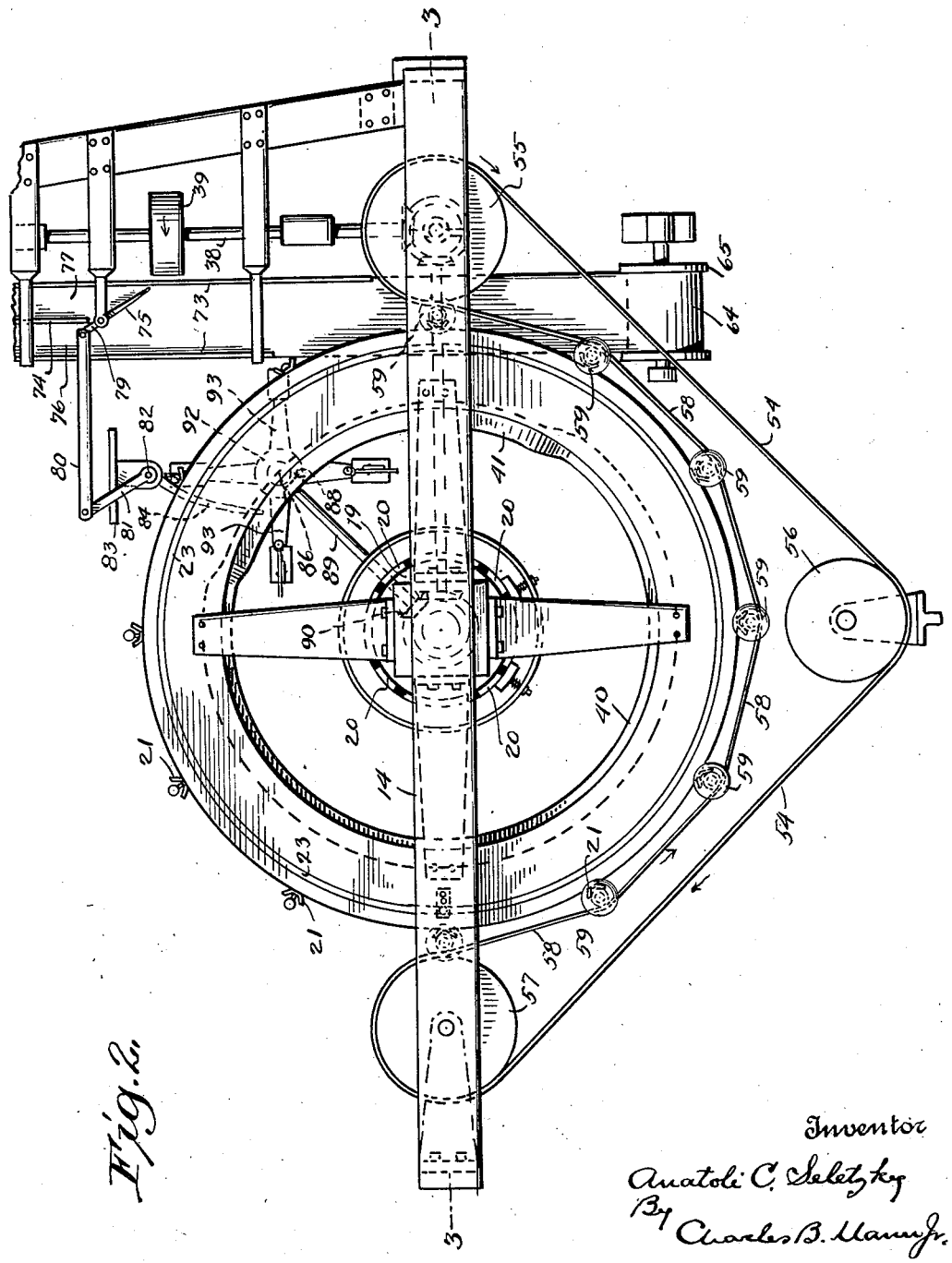
Fig. 2 illustrates the same in top view.
Figure 3:
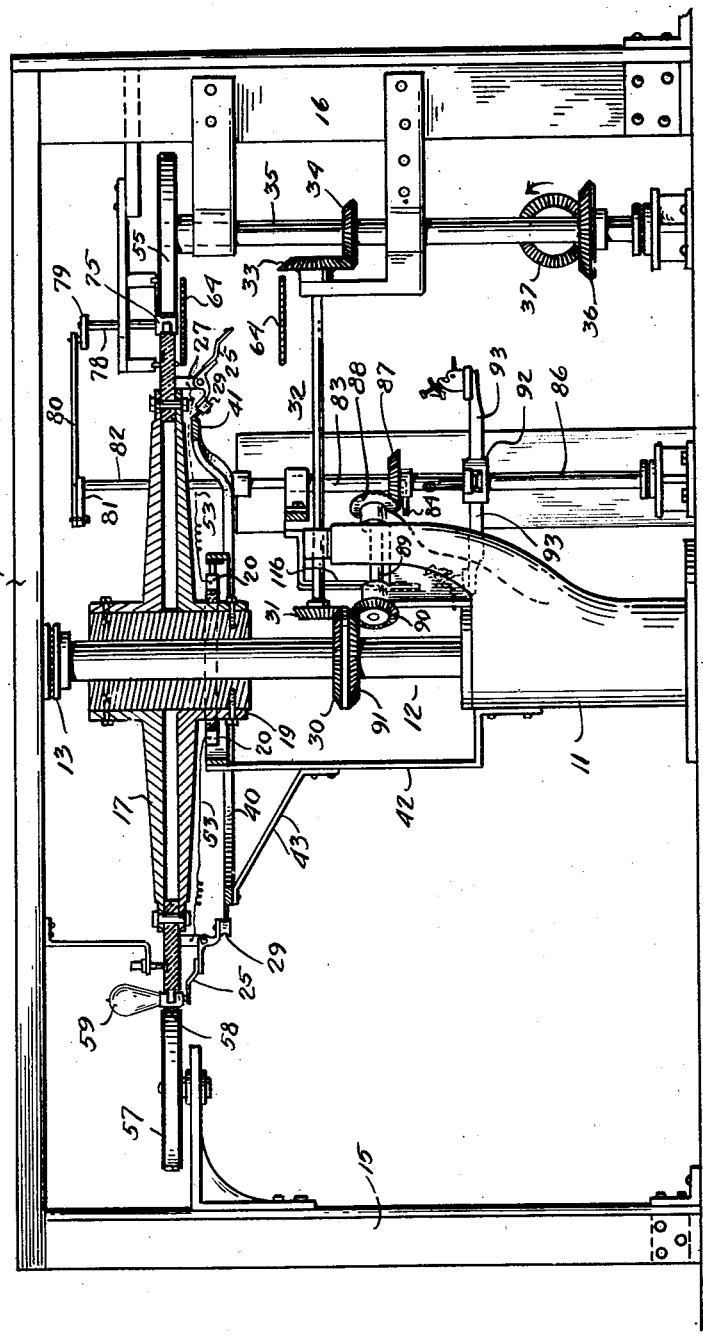
Fig. 3 shows the machine in central vertical cross-section as though viewed on the line 3—3 of Fig. 2.

Referring to the drawings and particularly Figs. 1, 2 and 3 thereof the numeral 10, designates a base plate on which the various standards and bearings are mounted.

At substantially the center of the base there is a vertical bearing-block 11, which sustains the lower end of a vertical carrier-shaft 12, whose upper end is retained in an anti-friction bearing 13, on the under side of a horizontal cross-beam 14. This cross-beam is supported, in this instance, by vertical posts 15 and 16 located at opposite sides of the machine, as best illustrated in Fig. 3 of the drawings.

The vertical carrier-shaft 12, sustains a head 17, which may hereinafter be referred to as an endless carrier, and this carrier is provided at its periphery with an annular ring-plate 18, preferably of an insulating material or at least insulated from the head. The head 17 has a depending hub 19 and around this hub, I arrange a series of contact plates or blocks 20. These plates or blocks are insulated from each other and are also insulated from the hub. While the number of plates or blocks 20 employed is not material, and may be varied, in the present instance, twelve blocks are employed.

Around the periphery of the ring-plate 18, I provide a series of socket plates 21, each of which is bolted or screwed to a radially-extending contact pin 22, which extends horizontally into the ring-plate and has an electrical metallic connection at its inner end with a circular contact plate 23 through a screw 24, as best illustrated in Figs. 6 and 7 of the drawings.

The circular contact-plate 23, in this instance, is embedded in the upper horizontal surface of the insulated ring-plate 18 and extends all the way around the ring-plate.

The socket-plates 21 are arranged around the ring-plate in a radial position with respect to the contact-blocks 20 around the hub,—there being one socket plate for each contact-block.

Adjacent to each socket-plate 21, there is a spring contact arm 25 each of which arms is carried by a lever 26, pivoted to a bracket 27 on the under side of the ring-plate.

The contact-arms extend from beneath the ring-plate and are located directly below the socket plates 21.

Each pivoted lever 26 has a rearwardly-extending arm 28 which carries a roller 29 for a purpose that will presently be explained.

The vertical carrier shaft 12, is provided with a beveled gear 30, with which a gear 31 on a horizontal shaft 32, meshes. This latter shaft also has a gear 33, which meshes with and is driven by a gear 34, on a vertical shaft 35, near the vertical side-post 16 as clearly seen in Fig. 3 of the drawings.

Vertical shaft 35, carries a second bevel gear 36, near its lower end which meshes with and is driven by a gear 37 on a main drive or pulley shaft 38, and this drive shaft is provided with a pulley 39, in this instance, by which said shaft is driven continuously.

It is thus to be understood that the horizontal driving shaft, which operates continuously, causes the main carrier-shaft 12, to turn continuously and thereby continuously rotate the head 17 or endless carrier and thus move the series of socket-plates 21 around an endless circuit or path.

Beneath the continuously-moving head 17 there is provided a cam-track 40 of a continuous ring-shape, and this cam-track is provided with a rise or elevated portion 41.

The position of this cam-track 40 is such that the rollers 29 on arms 28 of levers 26, may engage the periphery of the cam as said rollers, arms and levers are carried around with the head and by such engagement, the levers 26 may be rocked to swing arms 25, downwardly as the rollers move up the cam onto the rise 41 and to swing said arms upwardly again as the rollers move from the rise down to the lower level of the cam.

The raising and lowering of the arms 25 therefore takes place during the travel of the arms with the head and for a portion of each circuit travel, the arms will be raised while during the remainder of the circuit travel said arms will be lowered, as will presently be more fully explained.

The cam-track 40—41 may be supported in any suitable way but in the present disclosure, it is held by bracket-arms 42 and 43.

Referring now to Figs. 1, 2, 3, 8, 9 and 10 of the drawings, it will be noted that the bracket arms 42 sustain a ring-support 44, about the lower part of the hub 19 of the carrier and that through a portion of the inner circumference of this ring-support, there is a lining 45 of insulation.

The ring support is sustained about the traveling contact blocks 20 on the carrier and its purpose is to sustain a plurality of stationary contact plates 46 which have sliding engagement with the movable contact blocks 20 so as to close a circuit through the movable and stationary blocks as the carrier travels.

The stationary contact blocks 46, in the form shown, have stems 47 extending horizontally therefrom which stems project through a sleeve 48 of porcelain or equivalent material, while the sleeves are carried by and extend through the ring-support, as illustrated in Fig. 10 of the drawings.

Around the sleeves, I preferably provide coiled springs 49 which constantly urge the stems 47 and stationary blocks 46, inwardly against the movable blocks 20 around the carrier hub so that constant contact will be maintained between the stationary blocks 46 and those of the movable blocks 20, that are passing the stationary blocks.

It will thus be understood that as the carrier turns or travels the movable contacts 20 will successively pass and be engaged by the several stationary contact plates 46 so as to close a circuit between those contacts, provided the article to be tested is perfect as will presently be more fully explained.

The stem 47 of each stationary contact plate has a wire 50 connected therewith.

In addition to the contact plates 46, the ring-support 44 sustains another stationary contact-plate 51, which latter will also be engaged by the traveling contact plates 20, but for a different purpose also as will presently be explained and this contact plate 51 has a wire 52 connected therewith.

By reference to the diagrammatic view of Fig. 4, and also to Fig. 3 of the drawings, it will be noted that each movable or traveling contact-block 20, has a wire connection 53 with a radially-located bracket 27, and contact arm 25 at the periphery of the carrier, so that each contact arm 25, has an electrical connection with a coacting traveling contact-block 20.

By reference to Figs. 1, 2 and 4 of the drawings, it will be noted that an endless belt 54, is sustained in a plane substantially flush with the plane of the endless series of socket-plates 21 around the periphery of the carrier. This belt passes around pulleys 55, 56 and 57 and has one stretch or portion 58, which follows or travels close to the periphery of the endless carrier.

The stretch or portion 58 of the endless belt forms the working stretch of the belt in that it passes close to the socket-plates 21 and holds in those sockets the article which is to be tested while the carrier conveys that article past the testing stations.

While in showing the utility of the invention, I have elected to represent incandescent electric lamps as an article under test, it is to be understood that the invention may be utilized to test other electrical devices in quantities where the article is conveyed and a circuit formed therethrough during its travel so that if the circuit is completed through the article, an indication will be given and if such circuit is not formed then certain mechanisms hereinafter to be described will be operated whereby to effect a separation of the perfect from the imperfect articles.

In this instance, I show a series of electric lamps 59 which latter have been placed in the socket-plates 21, and then engaged on the outer side by the stretch or portion 58 of the endless belt 54, which holds the lamp-bases in the sockets and the carrier travels.

At the point where the lamps are placed in the socket plates the center contact arm 25 will be held up or in a horizontal position by the rollers 29 engaging the lower level of the stationary cam track so that when the lamp is placed in the socket 21, the metal socket portion 60 around the lower end of the bulb will have contact through the socket plate 21, pin 22 and circular contact plate 23 while the center bottom contact 61 of the lamp will have contact with the arm 25.

It should be recalled that each socket plate 21 is connected by the post 22 to the circular contact-plate 23 while each arm 25, has a connection through wire 53 with one of the movable contact plates 20. Therefore when the lamp is in place to be tested, it will close a connection between the arm 25 and the socket-plate 21, so that connections will up to that moment have been completed from the circular ring-plate 23 on the one side of the lamp to the movable contact block 20 on the other side of the lamp and the next step will be to close the circuit from the movable contact block 20 through a source of electric current to the said circular ring-plate. This is effected as follows:

By referring to the diagrammatic view of Fig. 4, it will be noted that a brush contact device 62, engages the circular contact plate 23 and that a wire 63 leads from said brush to a source of current supply. It will also be noted that the wire 50 from the several stationary contact plates 46 also leads to the source of current supply. Therefore when a movable contact block 20, passes and wipes over a stationary contact plate 46, a circuit will be closed from one side of the current supply through the lamp and back to said current supply.

If the lamp is a good one, the closing of the circuit therethrough will cause the same to become illuminated and thereby indicate that the same is good.

By providing several stationary contact plates 46, the lamps are kept burning for a sufficiently long period to cause a defect to show, if any of the same are defective.

The endless belt 54 with its stretch 58 serves as a traveling or endless clamp means to hold the lamps in the socket plates as they are traveling and being tested, and while it is not essential that this belt be positively driven, I have provided means for driving the same in that the pulley 55, is carried on the upper end of the vertical shaft 35 and the belt is passed around this pulley. In practice, the pully 55 will be driven at a speed that will cause the belt to travel at the same speed that the socket plates 21 travel.

By reference to Figs. 1 and 2 of the drawings, it will be noted that an endless conveyer belt 64, is provided at one side of the machine immediately beneath the periphery of the ring-plate 18 and that this belt travels around pulleys 65 and 66,—the latter being carried on a horizontal shaft 67 and driven through bevel gears 68 and 69 from a vertical shaft 70. This vertical shaft, (see Fig. 1) carries a bevel gear 71 which meshes with and is driven by a gear 72 on the main drive shaft 38.

Side guide plates 73 are provided at opposite sides of the conveyer belt 64 to prevent the lamps that are deposited thereon from rolling from the belt as they are conveyed.

At a suitable distance beyond the point where the lamps are deposited on the belt, I provide a division partition 74 which depends over the belt as shown in Fig. 2 of the drawings and immediately in front of this partition, I locate a mechanical switch-plate 75 which is so mounted that it may be swung in a horizontal plane across the conveyer belt 64 and direct a lamp that is moving toward the switch into either of the two channels 76 or 77 at opposite sides of the partition 74.

The switch-plate 75, is carried on the lower end of a vertical rod 78 which has a crank-arm 79 at its upper end and a lever 80 pivotally connects this crank-arm with a similar arm 81 on the upper end of a vertical rock-shaft 82.

This vertical shaft 82 is held in a bracket 83 and its lower end carries an actuating arm 84, which extends horizontally so that when said arm 84 is swung horizontally, the shaft 82 will be rocked and switch-plate 75 will be swung from one position to another across the conveyer-belt 64, so as to expose one or the other of the channels 76 or 77.

A coiled spring 85 about the vertical rock-shaft 82 serves to hold the latter normally in a position that will keep the switch-plate 75 swung over the entrance to channel 77 thus allowing good lamps to enter the channel 76 and only move the switch to divert a defective lamp into channel 77.

In front of the vertical rock-shaft 82, I provide another vertical shaft 86 and this latter shaft carries a bevel gear 87, which meshes with and is driven by a similar gear 88 on a horizontal shaft 89, which latter extends toward the central carrier shaft 12 and is driven by gears 90 and 91 from said carrier shaft, as shown in Fig. 3 of the drawings.

On the vertical shaft 86, I provide a rotary head 92, which, as shown in Figs. 1, 2 and 3 has a plurality of radial arms 93. One of these arms is illustrated on an enlarged scale in Fig. 5 of the drawings and particular attention is directed to that figure.

In the present instance, four arms 93 are shown and each of them carries a supporting bracket 94 to which a bell-crank shaped trip-lever 95 is pivotally attached. One arm 96 of this lever normally extends horizontally while the other arm 97 thereof extends upwardly and, in this instance, carries a roller 98 at its upper end.

A latching-pawl 99 is pivotally attached to the lever 95 and is so arranged as to engage a notch 100, on the bracket 94 when the lever is actuated so as to hold the arm 97 in substantially a vertical position to effect certain operations that will presently be explained.

A spring 101, or equivalent device, attached to the lever 95, serves to return it to its normal position immediately upon the release of the latching pawl 99 from engagement with the notch 100.

The rotary head 92, which carries the arms 93 and the bell crank levers 95, is revolved at a speed that will enable the four levers to cooperate with the twelve socket-plates 21 on the lamp-carrier 18, and actuation of those levers is effected electrically through a solenoid and the special contact plate 51 shown in Fig. 4, to which reference will now be made.

By reference to Figs. 1, 4 and 5 of the drawings, it will be noted that I make use of a solenoid 102, which has an armature 103 with a roller 104 on the outer free end thereof.

This solenoid is sustained so that the roller-end of the armature will project over the circular path through which the arms 96 of the bell-crank trip levers 95, travel. When the armature 103 is held up by the upper magnet 105 of the solenoid, the arms 96 will pass beneath the same but when the armature 103 is drawn down by the lower magnet 106, then the arm 96 next to arrive at the depressed armature will be depressed and the arm 97 of that lever thrown up and held in the elevated position by the pawl 99 engaging the notch 100.

The energization therefore of the upper magnet 105 allows the trip levers to pass without actuation while the energization of lower magnet 106 will cause armature 103 to actuate the next trip lever, and the energization of one magnet and deenergization of the other magnet is effected through the presence of a good or a defective lamp at the socket clamp next behind that one which is then discharging or is about to discharge a lamp onto the conveyer-belt 64.

By now referring to Fig. 4 of the drawings, it will be seen that I provide a special stationary contact plate 51 to coact with and be engaged successively by the movable contact plates 20 as the carrier turns or travels.

From this stationary contact plate 51, there leads a wire 52 which connects with the windings of an electro-magnet 107 that forms part of a relay and which controls an armature 108.

A wire 109 extends from the relay magnet to the upper magnet 105 of the solenoid 102 and from said upper solenoid magnet, there is a wire 110 which leads to and connects with the wire 50 of the current-supply.

In front of the relay armature 108 there is a stationary contact 111 from which a wire 112 leads to and connects with the windings of the lower solenoid magnet 106 and from said latter magnet, I provide another wire 113 which connects with the wire 110 and thus to wire 50 of the current supply.

It will be noted that armature 108 of the relay (in Fig. 4) is held by the magnet 107 away from the contact 111 and against the action of a spring 114 and that when said magnet 107 becomes deenergized the armature 108 will be drawn by said spring 114 until it engages contact 111 at which moment it will connect wire 112 with a wire 115 which latter leads to and connects with wire 63 of the current-supply.

From the foregoing explanation, it will be understood that electrical connections are provided from one side of the current-supply, say by wire 63 to brush 62 and circular contact plate 23 to the several socket-plates 21 about the carrier.

If no lamp is present in a socket-plate, then the connection from that particular plate to the contact arm 25 is interrupted, but if a lamp is in that socket-plate 21 and such lamp is good so that the circuit may be completed through it, then the connection will be formed from the socket-plate 21 to the metal socket 60 of the lamp, then through the lamp filament to the center contact 61; then by movable arm 25, lever 26 and bracket 27 to wire 53; then through one of the movable contact blocks 20, that is engaged by the stationary contact plate 51; then by wire 52 to and through relay magnet 107 and wire 109 so as to energize the upper magnet 105 of the solenoid and hold armature 103 up; then by wires 110 and 50 back to the current supply.

The circuit therefore, if the lamp is good, will energize upper solenoid magnet 105, and keep armature 103 elevated so the arms 96 of the trip levers will pass beneath the armature without being depressed.

On the other hand, if a lamp is defective and the current will not pass therethrough, then when the wire connections 53 of that lamp and its movable contact block 20 registers with the special stationary contact plate 51, no current will pass through those contacts 20, 51 and wire 52 to the relay magnet 107, consequently that relay will become de-energized and its armature 108 will swing away and engage contact point 111 thereby forming a substitute circuit through the lower magnet 106 of the solenoid, as and for a purpose that will now be explained.

When armature 108 closes with contact 111, a circuit will be formed from current supply line 63 by wire 115 to the armature, then through contact 111 to wire 112 and the lower magnet 106 of the solenoid thus energizing that magnet and pulling armature 103 down, and said circuit will be completed by wires 113, 110 and 50 back to the current supply.

The depression of the solenoid armature 103 with its roller 104 lowers the latter into the circular path through which the arms 96 of the trip levers travel so that the next arm 96, when passing beneath the lowered armature, will be depressed and held depressed by the pawl 99 thereof engaging the notch 100, thereby elevating the arm 97 of said lever and holding the same elevated until it shall have performed its function.

The timing in the rotation of the carrier and the rotation of the arms 93 and trip levers 95 is such that while special contact 51 is in complete engagement with contact 20, one of the trip-lever arms 96 will pass beneath the solenoid armature so that if that armature is depressed, the arm 26 of the trip lever then passing will also be depressed.

Those trip levers are provided so as to actuate the mechanical switch 75 over the conveyer belt 64, and this latter switch is moved when one of the raised arms 97 of a trip lever engages the actuating arm 84 on the lower end of vertical shaft 82.

It is to be understood that for each rotation of the carrier which holds and conveys the lamps to be tested, the head 92 and its arms 93 which carry the trip levers, will make three revolutions because there are twelve lamp carriers and but four trip levers.

By now referring to the diagrammatic view of Fig. 4 in the drawings, it will be noted that seven lamps are held by the carrier at points, which for the purpose of clearness in explanation, I have designated a, b, c, d, e, f and g, respectively.

The lamps at the points a, b, c and d, will, if good, be illuminated, at the point e, the good lamps will continue to be illuminated but through a special contact 51 to wire 52 etc.

At the point f, no circuit will be closed through the lamp and the same therefore will not be illuminated.

At the point g, the good lamp will be freed by the clamping belt 54—58 and will thereupon be deposited onto the conveyer-belt 64, and carried off into the channel 74, for the good lamps.

A defective lamp may be discovered by its failure to illuminate any of the points a, b, c, or d, but when it arrives at the point e, as current is not passing through it, it acts as a switch so that current cannot pass (at point e) through wire 53 to contact 20, and then to the special contact 51, consequently, the circuit through the solenoid magnets will be shifted from the upper magnet 105 to the lower magnet 106 and the solenoid armature 103 will be pulled down.

The timing of the head 92 on which the trip-levers are carried, is such that one trip lever arm 96 will at the moment the solenoid armature 103 is operated be beneath or just passing under that armature, and that trip-lever arm will be depressed so as to throw the arm 97 of the same trip-lever up and lock it up by its pawl 99.

Between this actuated trip-lever and the actuating arm 84 toward which it is moving, there is another trip-lever but as this lever was not operated by the lamp shown at the point f, because that lamp was good, that good lamp will be carried by the conveyer-belt 64 past the switch 75 because the trip lever for that lamp was not operated by said solenoid armature.

By the time the defective lamp reaches the conveyer switch 75 however, the trip-lever that was previously operated and its arm 97 raised, because of the defective conductor through that lamp, will have engaged the actuator arm 84 and rocked the shaft 82 and will swing the switch 75 over the entrance to passage 76 and hold it there as the defective lamp is directed into the passage 77 through which such defective lamps are carried.

The length of the actuator arm 84 is such that it will be held in the actuated position by the traveling trip-arm 97 until the defective lamp has passed into the passage 77 and as the trip-arm moves past said arm 84, the latter will swing back to its normal position because of the spring 85 on shaft 82 and thus restore the conveyer-switch to its normal position so as to close the passage 77 and open the passage 76.

After the trip lever has operated the switch 75, it will pass a re-setting bar 116, whose lower end is beveled so as to engage the pawl 97 on the actuated trip-lever and by depressing one end thereof release it from the notch 100 and allow the trip-lever to swing back to its normal position.

It will thus be seen that the article being tested (the lamp in this instance) acts as a switch for the relay 107 so that if the latter is energized when the contact 51 is engaged with any one of the movable contacts 20, the trip lever will remain in its normal condition, but if the lamp is defective and circuit is opened between the contact 51 and one of the contacts 20, then the relay is deenergized and the solenoid is actuated to set a trip which will separate the defective lamp from the good lamps.

Having described my invention, I claim,—

1. In a testing machine for electrically operated articles the combination with an endless carrier to convey the articles to be tested, a series of devices along the carrier each having two contact devices for engaging the two electric contacts of the said article, a series of movable contacts traveling with the carrier and each of the latter contacts having connection with one of the two contacts which engage the article to be tested, a contact with which the series of contacts successively engage and said latter contact being connected to a source of current whereby a circuit will be formed through the article when the one contact engages any one of the series of contacts provided the article is electrically good and means coacting with said series of contacts in succession to separate the defective articles from those which are good.

2. In a machine for testing electrically operated articles which have contacts for the passage of current therethrough the combination with a carrier for the article to be tested, of means moving with the carrier to engage the electric contacts to and from the article, means coacting with the latter moving means to complete circuit connections to and from the moving article to test the latter while it is advancing, a conveyer to carry the tested articles off and means coacting with the conveyer and operated upon the failure of current to pass through the article under test to separate the defective articles from the good ones on the conveyer.

3. In a machine for testing electrically operated articles that have contacts for completing a circuit therethrough the combination with a circular carrier, of a circular series of contacts movable with the carrier, a series of holders for the articles to be tested and each holding device having devices to engage the two contacts of the article, a stationary contact to engage the circular series of contacts traveling with the carrier and the articles under test to close the connections to and from the carrier, a conveyer to carry the tested articles from the carrier, a mechanical switch in the conveyer, and means actuated by the failure of current to pass through the article for controlling the conveyer switch to separate the defective from the good articles.

4. A machine for testing electrical devices, each device having a plurality of contacts for the passage of electrical energy therethrough, comprising an electrical testing circuit, a conveyor for supporting a plurality of said devices, means movable with said conveyor for electrically connecting the contacts of said devices with said testing circuit, and means for separating devices through which electrical energy flows from devices through which electrical energy will not flow.

5. A machine for testing electrical devices, each device having a plurality of contacts for the passage of electrical energy therethrough, comprising an electrical testing circuit, a conveyor for supporting a plurality of said devices, means movable with said conveyor for electrically connecting the contacts of said devices with said testing circuit to cause a flow of electrical energy through said devices and means for collecting devices passing a flow of a predetermined amount of energy therethrough.

6. In a machine for testing electrical vacuum devices having base portions, the combination with an electrical testing circuit, a conveyor, a plurality of means on said conveyor to receive the base portions of a plurality of said devices, electrical connections for each of said devices for connecting said devices as temporary portions of said electrical circuit to permit a flow of electrical energy through said devices and means for separating devices through which electrical energy flows from devices through which said energy does not flow.

7. In a machine for testing electric lamps the combination with an electrical testing circuit, a conveyor, means on said conveyor for receiving the base portions of said lamps, electrical connections for each of said lamps movable with said conveyor, means for moving said conveyor to successively connect said lamps with said testing circuit for a flow of electrical energy through said lamps, and means for separating lamps through which electrical energy flows from lamps through which electrical energy does not flow.

8. In a machine for testing electrical vacuum devices having base portions the combination with a conveyor, an electrical testing circuit, electrical connections for each of said devices movable with said conveyor for electrically connecting said devices with said circuit upon a movement of said conveyor, electrically controlled mechanism operable upon a variation in the degree of the flow of current through said devices for separating into groups devices passing a given amount of electrical energy.

In testimony whereof I affix my signature.
ANATOLI C. SELETZKY.